United States Patent Office 3,534,471

Patented Oct. 20, 1970

3,534,471
METHOD OF MAKING A COMPUTER MEMORY STACK

Richard W. Babbitt, Middletown, Joseph Newberg, West Long Beach, William Schlosser, Eatontown, and Lydia A. Suchoff, Shrewsbury, N.J., assignors to the United States of America as represented by the Secretary of the Army No Drawing. Filed June 9, 1967, Ser. No. 645,583
Int. Cl. H01f 7/06
U.S. Cl. 29—604 1 Claim

ABSTRACT OF THE DISCLOSURE

A computer memory stack is obtained from individual rectangular films of fired ferrite material. A conductive coating is applied to one of the surfaces of each ferrite film. The films are then assembled and hot pressed to obtain the complete stack.

BACKGROUND OF THE INVENTION

This invention relates to a method of making a computer memory stack.

Heretofore, memory elements have been made by methods generally involving the weaving in or plating of conductive wire through a core which has been prepared by conventional sintering techniques. These methods have been costly and time consuming.

The general object of this invention is to provide an inexpensive method of making a computer memory stack. A more specific object of the invention is to provide such a method wherein hot pressing is an essential step of the method.

SUMMARY OF THE INVENTION AND PREFERRED EMBODIMENT

The method of making a computer memory stack according to the invention includes the steps of:

(1) Preparing a dispersion of an inorganic ferrite powder in an organic binder, (2) Forming a plurality of rectangular films from the dispersion, (3) Applying suitable conductors to at least one of the surfaces of the respective ferrite films, (4) Assembling the conductively coated ferrite films in the desired wiring configuration, (5) Heating the rectangular films to remove the organic binder and leave a plurality of ferrite films, and (6) Hot pressing to obtain the stack.

In step 1 above, any inorganic ferrite powder can be used that is characterized by rectangular hysteresis loop properties. Such inorganic ferrites include lithium ferrite, lithium-zinc ferrite and manganese-magnesium-zinc ferrite. The dispersion of inorganic ferrite powder in the organic binder is easy to handle, is inexpensive, and can be used for all sizes of powders. A minimal amount of organic binder is used to hold the inorganic ferrite powder together. Moreover, the thickness of the rectangular films formed from the dispersion in step 2 above can be easily controlled by suitable means such as doctor blading or casting.

In step 3 above, suitable conductors, such as copper or silver, are applied to at least one of the surfaces of the ferrite film by suitable conventional means such as printing, painting, evaporation, or as a solid wire.

In step 4 above, the conductively coated ferrite films are assembled in the desired wiring configuration.

In step 5 heretofore, the individual rectangular films are heated in an air atmosphere at a suitable temperature to remove the organic binder and leave a plurality of ferrite films of about 5 mils in thickness. Organic binders that can be used include methyl methacrylate, polyvinyl acetate, etc. in which case the heating temperature required to remove the binder is about 200° C.

In step 6 above, the assembly is hot pressed at a temperature of about 900 to 1050° C. and a pressure of about 4,000 to 6,000 p.s.i. to obtain the complete stack of memory element which is mechanically firm and rigid. The hot pressing step enables the use of low resistivity conductor materials due to the lower firing temperatures permitted by hot pressing. The hot pressing step also produces minimum reaction between conductor and ferrite. A reduction in the resistance of the conductors permits a reduction in the drive circuit requirements. Conventional firing of a lithium ferrite, for example, requires a temperature of about 1200 to 1300° C. for a matter of hours whereas with hot pressing, there is only a requirement of a temperature of 900° to 1000° C. for less than 10 minutes.

Variations of the above-described method are to be considered as coming within the scope of the invention. For example, one might utilize the inorganic ferrite powder without the organic binder.

After fabricating the stack, the conductors may be exposed by conventional means such as milling the faces of the hot pressed stack and interconnections than made to the exposed conductors.

The foregoing description is to be considered merely as illustrative of the invention and not in limitation thereof.

What is claimed is:

1. A method of making a computer memory stack, said method including the steps of:

(1) preparing a dispersion of an inorganic lithium ferrite powder in an organic binder, (2) forming a plurality of rectangular films from said dispersion, (3) applying suitable conductors chosen from the group consisting of copper and silver to at least one of the surfaces of each of the ferrite films, (4) assembling the ferrite films and conductors in the desired wiring configuration, (5) heating the rectangular films to remove the organic binder and leave a plurality of ferrite films, and (6) hot pressing the assembly at a temperature of about 900° to 1050° C. and a pressure of about 4,000 to 6,000 pounds per square inch for substantially 10 minutes.

References Cited

UNITED STATES PATENTS

| | | | |
|---|---|---|---|
| 2,985,939 | 5/1961 | Brockman | 264—113 X |
| 2,990,602 | 7/1961 | Brandmayr et al. | 264—113 X |
| 3,333,333 | 8/1967 | Noack | 29—604 |
| 3,379,523 | 4/1968 | Chaklader | 75—226 |
| 3,400,455 | 9/1968 | Gosgrove | 29—604 |
| 3,189,550 | 6/1965 | Malinofsky | 252—62.5 |
| 3,376,561 | 4/1968 | Danylchuk | 340—174 |

OTHER REFERENCES

Seybolt and Burke, Experimental Metallurgy, 1953, John Wiley and Sons; pages 271–272.

JOHN F. CAMPBELL, Primary Examiner

C. E. HALL, Assistant Examiner

U.S. Cl. X.R.

75—206, 208, 226; 264—112; 340—174